United States Patent [19]

Kermisch

[11] 4,079,421
[45] Mar. 14, 1978

[54] IMAGE SCANNING SYSTEM

[75] Inventor: Dorian Kermisch, Penfield, N.Y.

[73] Assignee: Xerox Corporation, Stamford, Conn.

[21] Appl. No.: 667,920

[22] Filed: Mar. 16, 1976

Related U.S. Application Data

[63] Continuation-in-part of Ser. No. 526,875, Nov. 25, 1974, Pat. No. 3,946,433.

[51] Int. Cl.² .............................................. H04N 5/30
[52] U.S. Cl. ...................................... 358/209; 358/5; 358/205; 358/208
[58] Field of Search ...................... 178/7.2, 7.6; 358/5, 358/206, 208, 199, 209; 350/161

[56] References Cited

U.S. PATENT DOCUMENTS

| | | | |
|---|---|---|---|
| 3,013,467 | 12/1961 | Minsky | 358/199 X |
| 3,447,852 | 6/1969 | Barlow | 358/208 X |
| 3,601,470 | 8/1971 | Juhlin, Jr. | 350/161 |
| 3,719,780 | 3/1973 | Gazard et al. | 358/206 |
| 3,763,312 | 10/1973 | Yoneyama | 358/5 X |
| 3,888,591 | 6/1975 | Roetling | 350/161 X |

Primary Examiner—Richard Murray
Attorney, Agent, or Firm—James J. Ralabate; Eugene O. Palazzo; John E. Crowe

[57] ABSTRACT

A system for scanning an amplitude or a phase image and rapidly converting it into a video signal is disclosed. The image is scanned with a focused light beam such as from a laser and the information-modulated light is detected by fixed detectors and converted into a video signal which may then be electronically processed. The method is capable of performing in a scanning mode the same optical processing as is performed by conventional partially coherent optical processing systems. This novel method provides a video signal which represents the processed image. A particularly preferred embodiment comprises simultaneously scanning multiple color encoded surface deformation phase images which together represent a full color original object and generating simultaneously the three video signals that represent the primary colors (red, green and blue) of the original object.

17 Claims, 7 Drawing Figures

IMAGE SCANNING SYSTEM

CROSS REFERENCE TO RELATED CASES

The present application is a continuation-in-part of prior copending application entitled "Phase Image Scanning Method", Ser. No. 526,875, filed Nov. 25, 1974, now U.S. Pat. No. 3,946,433.

BACKGROUND OF THE INVENTION

The invention pertains generally to the area of image scanning and is more particularly directed to image processing by laser scanning.

The term "optical processing" is used to describe the operations or changes performed on visible electromagnetic radiation (light) containing information (an image) by an optical system. The optical processing of information for various reasons is known in the art and is usually embodied in one of three forms. Either coherent, non-coherent or partially coherent systems are used to process an intelligence into a desired form. A non-coherent optical processing system differs from a coherent or partially coherent system in a number of ways, the main difference being the presence of redundancy. Examples of non-coherent optical processing are noted in an article entitled "Non-coherent Optical Processing" by G. L. Rogers in *Optics and Laser Technology* (*August* 1975), pg. 153–162. Also, in the past many methods for coherent processing of images have been proposed. Some examples of these are described by W. Goodman in "Introduction to Fourier Optics", McGraw-Hill, New York, 1968 at Chapter 7.

Generally, these methods have in common the fact that the original image, which is recorded on a transparency (or reflecting medium) is processed by a coherent (or partially coherent) optical system, and the resulting processed image is in the form of an intensity image that is either displayed or recorded on a recording medium for later viewing or further processing.

For certain applications, it is desirable to obtain an electronic video signal proportional to the irradiance of the processed image. The video signal can be obtained in real time either by scanning the intensity image with a small electrooptic detector or by projecting the intensity image onto a larger transducer such as a TV camera or the like. The first method has very poor light utilization, because the whole image is illuminated by the source and only a very small fraction of the total flux is detected at each instant. In the second method, the quality of the image including its resolution, dynamic range, and a signal-to-noise ratio is limited primarily by the TV camera used. Except for the case of expensive, special-purpose cameras these limitations may be unacceptable.

Recently, there has been developed a scanning system which efficiently uses a collimated source of light in detecting an image to allow the storage and efficient electronic processing of the image. This system, its utilization, advantages, and teachings are more fully described in the cross-referenced copending application, the entire disclosure of which is herein incorporated by reference. The copending application is directed to a method for scanning phase, or surface relief images. However, the method can be practiced equally well with amplitude images such as transparencies and opaque objects. Moreover, in many instances, it is advantageous to combine optical processing techniques on the image information with subsequent electronic processing of the same image information. This may be specifically advantageous when the image parameters to be changed are area changes and do not represent point by point calculations which can be efficiently done electronically.

SUMMARY OF THE INVENTION

It is therefore an object of this invention to provide a novel image scanning system.

Another object of the invention is to provide a laser image scanning method which can provide the same optical processing, in a scanning mode, as conventional optical image processing systems.

It is a further object of the invention to provide a novel method for converting an image into video signals.

Another object of the invention is to provide a novel method of scanning amplitude images.

Still another object of the invention is to provide a novel method of scanning phase images.

Another object of the invention is to provide a novel method of scanning color images using a one color laser.

Yet another object of the invention is to provide an image scanning method which also performs optical processing.

It is another object of the invention to efficiently utilize the source illumination used in an optical processing system.

A further object of the invention is to provide a system capable of combining optical and electronic processing of images.

These and other objects and advantages are accomplished according to the invention by providing a method for scanning an image and rapidly converting it into a video signal. The image is scanned with a focused light beam such as from a laser and the information-modulated light detected by fixed detectors and converted into video signals which may then be electronically processed. In a preferred embodiment, optical processing is performed, with or without subsequent electronic processing. The method is capable of performing in a scanning mode the same optical processing as is performed by conventional, partially coherent, optical processing systems. This novel method provides a video signal which represents the processed image.

According to this system there must be maintained a particular relationship between the location of the various optical elements. The system comprises a deflector means located on the optical axis of a focusing lens and spaced at a distance equal to the focal length of the lens. The image to be scanned is on the opposite side of the focusing lens and spaced at a distance of one focal length away. A readout lens is located at a distance equal to its focal length on the other side of the image. A photodetector means is situated in a plane perpendicular to the optical axis of the system and at a distance equal to the focal length of the readout lens. Depending on the particular embodiment being practiced, the focusing lens and the readout lens may be separate lenses or one lens may perform both functions.

Scanning is achieved by deflecting a collimated light beam such as from a laser and focusing the light beam on the image (always at the same angle of incidence). The readout lens collects the information modulated light and images it onto the detector which converts it into video signals. The video signals may then be electronically processed to provide desired results. In addition, and independent of any electronic processing which is performed, optical processing of the image information may be performed by various means such as by varying the amplitude and phase distribution of the collimated light in the deflection plane. This may be done, for example, by shaping the light beam before deflection or by properly designing the deflector (for example, where the deflector is an oscillating mirror, shaping the local amplitude reflectance of the mirror). Also, for a given scanning beam light distribution the characteristics of the image represented by the video signal can be controlled by controlling the size and location of the detector in the detector plane.

The system of the present invention has been described by applicant in a publication entitled "Partially Coherent Image Processing By Laser Scanning" in *Journal of the Optical Society of America,* Vol. 65, No. 8 (August 1975) at page 877, the entire disclosure of which is hereby incorporated by reference herein.

BRIEF DESCRIPTION OF THE DRAWINGS

For a better understanding of the invention as well as other objects and further features thereof, reference is made to the following detailed description of various preferred embodiments thereof, taken in conjunction with the accompanying drawings wherein.

DESCRIPTION OF THE PREFERRED EMBODIMENTS

Figure 1:
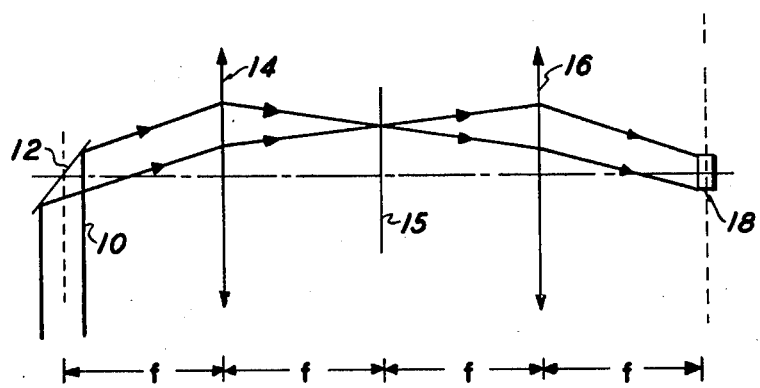
FIG. 1 is a schematic representation of a transmissive mode scanning system according to the invention.

FIG. 1 illustrates a transmissive mode scanning system according to the invention. Referring now to FIG. 1 there is seen a collimated light beam 10 from a laser or a like source which is deflected by a deflector means 12 onto a first lens means 14. In a preferred form the deflector is an oscillating scanning mirror. The first lens means 14 focuses the light beam 10 onto a transparency 15 containing an image. The focused light is always incident at the same angle on the image. The transparency is placed one focal length away from the first lens means and normal to the optical axis of the system. The focused beam passes through the transparency and is collected by a second lens means 16 situated one focal length away from the transparency and on the opposite side thereof from the first lens means 14. The second lens means 16 refocuses the transmitted beam onto a photodetector 18 which is located in a plane one focal length away from the second lens means 16. The deflector 12 oscillates in both *x* and *y* directions and a sweep of the deflector 12 allows the scanning of the entire image.

The output of the scanner is a video signal that represents an image. At each instant, the video signal represents the image at the location of the focused beam. It is assumed that the photodetector produces a video signal proportional to the light irradiance incident upon it. In this case, when reference is made to an "output image", there is meant an image, whose local irradiance is proportional to the instantaneous value of the video signal.

The characteristics of the output image are controlled by:

a. Its coherence is controlled by the relative size of the detector versus the size of the cross-section of the collimated beam at the deflector 12 plane.

b. Its spatial frequency content is controlled by the size of the collimated beam, by the complex amplitude distribution of the light in the collimated beam at the deflector plane, and by the relative position of the detector with respect to the optical axis.

The beam of collimated light 10 will have an amplitude and phase distribution function that is a characteristic of the source used. As aforesaid, optical processing of the image in formation may be performed where desired. According to the invention, by tailoring the amplitude and phase distribution of this beam to match the characteristics of a spatial distribution filter of conventional type the image on transparency 15 may be optically processed in a manner similar to that of a conventional system such as that illustrated in FIG. 2 and labeled prior art.

Figure 2:
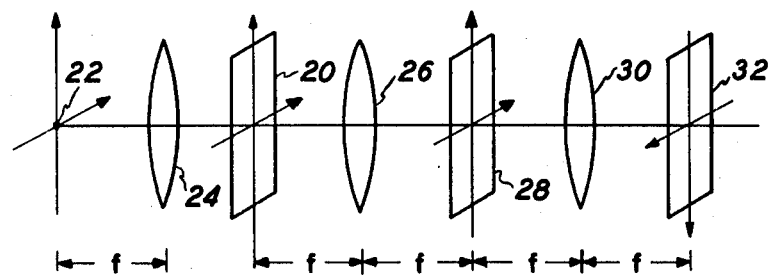
FIG. 2 is a schematic representation of a conventional optical, partially coherent, image processing system.

FIG. 2 shows a conventional prior art system for optically processing an image transparency 20 located at the image plane of the system. The conventional system is known but will be explained to provide a reference with which the invention may be explained. The image on the transparency 20 is illuminated by a source 22 which is collimated by a lens 24. The energy that is transmitted through the transparency 20 is collected and focused by a lens 26 one focal length from the image plane. The lens 26 focuses the Fourier spectrum of the transparency upon a spatial frequency filter 28 located one focal length away from the lens 26. A lens 30 again recreates the image and focuses it in an aerial pattern 32 in the image plane. It is the amplitude and phase distribution characteristics of the spatial frequency filter 28 that affect the spatial frequencies of the input image and produce optical processing. The size and position of the source 22 (assumed to be quasimonochromatic and spatially incoherent) relative to the size of the spatial filter 28 affect the coherence properties of the output image.

When the focal lengths of lenses 14 and 16 in FIG. 1 are respectively equal to those of lenses 26 and 30 in FIG. 2, the optical processing properties of the two systems are identical (in the absence of lens aberrations) if:

a. the complex amplitude distribution of the light in the collimated laser beam, in the deflector plane 12, is proportional to that of the complex amplitude transmittance of the spatial frequency filter 28; and b. the size and position relative to the optical axis of the photodetector 18 is equal to the size and position relative to the optical axis of the quasi-monochromatic source 22. If this is accomplished then the laser scanning system of FIG. 1 will be a direct emulation of the conventional system shown in FIG. 2 and the irradiance of the aerial image in the image plane when detected electronically will be proportional to the video signal developed by the detector 18 of FIG. 1.

The effects described above are illustrated by the following examples. In conventional systems optical differentiation is achieved by introducing a linear amplitude transmittance wedge in the Fourier plane. To illustrate the effect of shaping the amplitude distribution of the laser beam in the scanning system of FIG. 1, such a wedge was approximated by passing a laser beam of 3.5 millimeter in diameter through a linear density wedge just before the beam 10 was incident on the scanning mirror 12 of FIG. 1. The transmittance of a wedge linear in density is an exponential function of position. The wedge introduces additional attenuated higher differentiation orders in the process. However, the use of such a wedge enables one to show qualitatively that a differentiation process takes place in such a scanning system. Clearly any scanning system designed for optical differentiation must not only use the correct type of wedge but must also place it accurately in the mirror plane. The effect of a wedge linear in amplitude transmittance can also be obtained by use of a scanning mirror whose amplitude reflectance varies linearly over its surface or alternatively one can place such a wedge in a path of the laser beam and by use of a telecentric optical system project its image onto the mirror plane.

Figure 4:
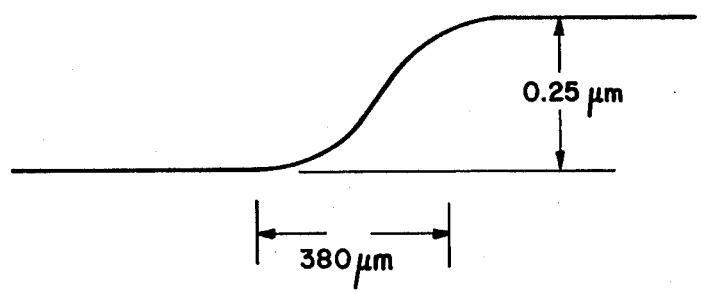
FIG. 4 is a density profile of a scanned phase image used in making the traces of FIGS. 3A-3E.

Since the wedge used was larger in diameter than the laser beam, in order to make use the total density variation of the wedge, the beam was passed in almost a glancing incidence through the wedge. The scanned phase image consisted of a nonuniform layer of aluminum deposited on glass and having an approximate thickness profile as that shown in FIG. 4. The image was then scanned in reflection with a folded scanning system that was equivalent to the one shown in FIG. 1.

In FIG. 3A the trace of the scanning system is shown with no density wedge in the beam path. The small variations of the signal were due to imperfections in the layer surface. The horizontal scale is 87μm/division.

In FIG. 3B the signal with the wedge present is illustrated. The effects of the differentiation of the phase image are shown on the ordinate axis where the differentiation spike is noted to be approximately two divisions in height. The horizontal scale is 87μm/division.

To illustrate the coherent incoherent relationships of the scanning and processing system the following examples were performed. A knife edge was scanned in a system such as shown in FIG. 1 with lenses of 250mm focal lengths. FIG. 3C is a video signal representation of the scan. The horizontal scale is 87μm/division, the collimated beam was 2mm-in diameter, and the detector size was 1.0 × 1.0mm. The system is equivalent to a spatialfilter bandwidth for the incident He-Ne laser of approximately 6 lines/mm. Repeating the experiment with a 0.12 × 1.0mm detector (small dimension in scan direction) resulted in the trace illustrated in FIG. 3D. The scale is equivalent and it is noted that ringing, characteristic of coherent imaging, is present whereas there is none in FIG. 3C. The reason as described before is the larger detector, which is equivalent to a larger, less coherent illuminating source is a conventional system.

Again repeating the first trace with a detector 1.0 × 1.0mm but with a 10mm in diameter beam the trace of FIG. 3E was obtained (horizontal scale 17.5μm/division). In spite of the same size detectors used for FIGS. 3C and 3E, ringing is apparent in the experiment. This is due to the increase in bandwidth of the equivalent spatial filter from approximately 6 to 30 lines/mm. This effect is encountered in conventional optical processing systems. This is explained by the increase in the bandwidth by a factor of 5 in the example shown in FIG. 3E. Hence, the beam-to-detector ratios are approximately the same in the examples of FIGS. 3D and 3E. For this reason, the coherence characteristics of the two images are similar.

The optical processing capabilities of the scanning system have been described with respect to an embodiment wherein the amplitude and the phase distribution of the collimated light are shaped before the light reaches the deflector. Of course, many other embodiments are possible. For example, where the deflector is an oscillating mirror the complex amplitude light reflectance of the mirror itself may be shaped such as by causing the mirror to be more and less reflective in different areas. This can be done by covering the mirror with nonuniform dielectric layers. In another embodiment the system may be made to provide more coherent or more incoherent imaging by controlling the relative size relationship of the light beam and the detector. As the detector becomes smaller with respect to the light beam, the system becomes more coherent. For example, where the beam is about ten times the size of the detector, coherent imaging is obtained. As the detector size becomes large with respect to the size of the beam, for example, about twice as large, then incoherent imaging is obtained. Optical processing may also be practiced according to the scanning system by varying the position of the detector in the detector plane with respect to the optical axis. As the detector is moved away from the optical axis, the lower spatial frequencies are progressively filtered out.

A proposed mathematical proof for the optical processing by the scanning system is set forth in applicant's publication entitled "Partially Coherent Image Processing by Laser Scanning", referred to above herein. This proposed proof is an aid to those skilled in the art to better understand and appreciate the invention. It should be noted, however, that there is no intention to limit the system to the proposed proof since the system has been shown to be operative through experimentation.

It should be noted that in spite of the fact that the optical part of the laser scanning system is purely coherent the entire imaging system which includes a detector can be almost anything from almost coherent to almost incoherent depending upon the size of the detector. By use of additional optical elements in the path of the laser beam before it reaches the deflector 12 or by the generation of the beam itself, the magnitude and phase of the beam 10 can be shaped to have the characteristics of any desired and realizable spatial frequency filter such as that of the conventional system filter 28 of the system shown in FIG. 2. Further spatial frequency filters that are not readily realized may be provided by this method to provide optical processing not heretofore available. Additionally, the scanning system described has a very good utilization of light. At any instant, a large fraction of the illuminating light can fall on the detector. The system resolution depends primarily on the size of the collimated beam and of the quality of the optical elements.

Figure 6:
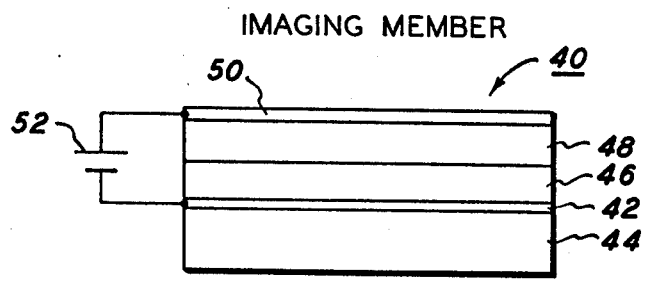
FIG. 6 is a partially schematic, cross-sectional view of an imaging member suitable for use with the scanning system.
Figure 5:
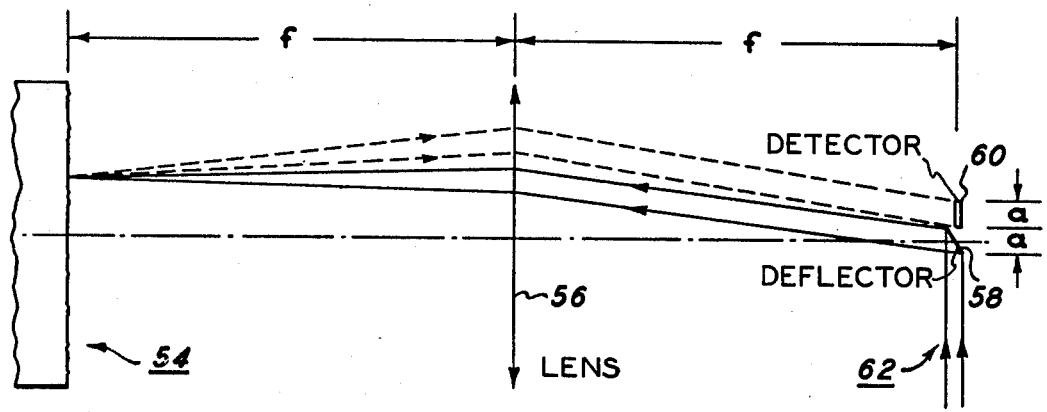
FIG. 5 is a schematic representation of a reflective mode scanning system according to the invention as used to scan sinusoidal surface relief images.

A different embodiment is shown in FIG. 5 wherein the system is used in reflection to scan sinusoidal surface relief images (the information is contained in the local amplitude of the sinusoidal surface relief). Typically, an image scanning system employs a detector to "read" the light reflected from the surface of the image. However, when a diffusely reflecting image is scanned by a beam of collimated light only a minute part of the scattered light reaches the detector. For any given gain-bandwidth product of the detector the amount of light collected by the detector limits the scanning speed. The diffusely reflecting original image may be converted into a phase (surface relief) image, as for example, by imaging it onto a deformation imaging member such as that shown in FIG. 6 and the phase image scanned according to the invention. Referring now to FIG. 6 there is seen an imaging member 40 comprising a first electrode made up of transparent conductive layer 42 and a transparent, non-conductive substrate 44. Overlying the first electrode is photoconductive layer 46 which in turn carries elastomer layer 48. Thin flexible conductive metallic layer 50 comprises a second electrode. The electrodes are connected to opposite sides of power source 52 which may be A.C., D.C. or a combination thereof. The imaging member may include other elements such as an absorption-type line grating which may be located at the interface between conductive layer 42 and photoconductive layer 46. In operation an electrical field is established across the member, and it is exposed to an imagewise pattern of activating electromagnetic radiation with the result that the elastomer layer 48 and flexible metallic layer 50 deform in imagewise fashion. The member can be read out by a schlieren optical system whereby an optically positive image is produced by diffracted light (higher orders) and an optically negative image is produced by the undiffracted light (zero order). Of course, this imaging member is intended to be illustrative only; any deformation imaging member may be used in the embodiment of the invention shown in FIG. 5. U.S. Pat. No. 3,716,359 describes various suitable deformation imaging members. Where an imaging member such as that shown in FIG. 6 is employed, the diffracted light provided by scanning the phase image with collimated light is specularly reflected and can be detected by small fixed detectors. In this way, an appreciable fraction of the light is collected by the detector and the scanning speed can be increased in comparison with the embodiment wherein the diffusely reflecting image is scanned directly. Nevertheless, it should be understood that the method may be practiced by scanning the diffusely reflecting image directly.

Referring now to FIG. 5, the basic elements of this embodiment of the inventive system include a phase image 54, a lens 56 with focal length $f$, a deflector 58 and a detector 60. A collimated beam of light 62 from a source of collimated light, such as a laser or arc lamp (not shown), is deflected by the deflector 58, which is positioned on the optical axis of the lens 56, at a distance of one focal length from the lens. This position ensures the important condition that the scanning beam is normal to the surface of the phase image 54. Because the surface of the phase image is placed in the other focal plane of the lens 56, the collimated beam incident on the lens is focused on the image. A comparison of the scanning system of FIG. 5 with that of FIG. 1 shows that they are optically equivalent if the detector of the scanning system of FIG. 5 is placed to collect the zero order portion of the diffracted beam and the transparency 15 of the FIG. 1 system is replaced by the reflective phase image of the imaging member 54. The phase images herein contemplated specularly reflect a majority of the incident readout light at certain predetermined angles to create a diffraction pattern at the Fourier plane. The pattern is characterized in that points, or spots, of light representing the diffracted orders appear in a symmetrical arrangement about the focal point or zero order reflected light. In a one grating system the diffracted orders are equally spaced from the focal point in the direction of the grating. See, for example, FIG. 5 wherein the distance is "$a$", thereby providing a diffracted order at point "$a$" and one at "$-a$".

Figure 7:
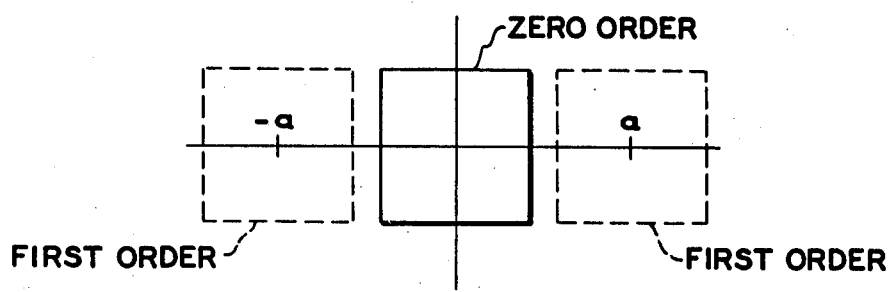
FIG. 7 is a schematic representation of some of the diffracted orders, and zero order, showing their relative locations for a deflector of a given size as they occur in the embodiment of FIG. 5.

The zero order reflected light from the phase image retraces the path of the incident beam and illuminates the deflector 58. The diffracted first orders (two of which are shown in FIG. 5) produce in the focal plane of the lens two spots of light of equal form and size as the deflector projection on the focal plane. If the centers of these spots are at a distance "$a$" from the optical axis, see FIG. 7, the requirement that the spots of light corresponding to the zero and first diffracted orders do not overlap, limits the size of the deflector, in the direction of the diffracted orders, to approximately "$a$". The diffracted orders thereby created are stationary on one plane. The basic principle is to position the deflector and the phase image in the opposite focal planes of one lens, and the phase image and the detector in the opposite focal planes of another, or the same, lens.

Of course, it should be obvious that the scan pattern is a two-directional movement, one vertical and one horizontal. Furthermore, it should be understood that even higher order, i.e., above the first order, diffracted light spots do occur but are relatively insignificant and are usually disregarded.

In the case where the local reflectivity of the phase image is varying, as with the imaging member of FIG. 6, a separate detector can be used to monitor the zero order. Zero order monitoring requires that the phase image be at a slight angle with the lens, thereby focusing that portion of the light away from the deflector 58. The angle would be as small as possible to minimize image distortion. Or, in the alternative, a beam splitter can be used which reflects part of the diffracted light in a different direction, away from deflector 58. If we denote by $I_1$ and $I_0$ the instantaneous video signal corresponding to one first diffracted order and the zero order respectively, the electronically produced ratio $I_1/I_0$ provides a measure of the diffraction efficiency of the original image, independent of the local reflectivity of the phase image.

If the phase image contains more than one periodic carrier (it does not have to be sinusoidal), a multiplicity of diffracted orders occur. Any or all of these diffracted orders can be detected separately by using more than one detector, appropriately placed in the plane of detector 60 in FIG. 5.

The scanning system described above, when used with an imaging member that encodes color information in the form of amplitude modulated periodic gratings, can generate separate video signals each of which represents a separate color of the original object by using only a one color laser for scanning purposes. A technique for encoding an original multicolor object is an imaging member in the form of a plurality of surface deformation phase gratings at different angular orientations, each representing a particular color present in the original object is described in detail in copending application Ser. No. 526,875, now U.S. Pat. No. 3,946,433. By electronically processing the separate video signals, it is possible to obtain color corrected reproductions of the original object as is more fully described in copending application Ser. No. 526,875, now U.S. Pat. No. 3,946,433.

Figure 3:
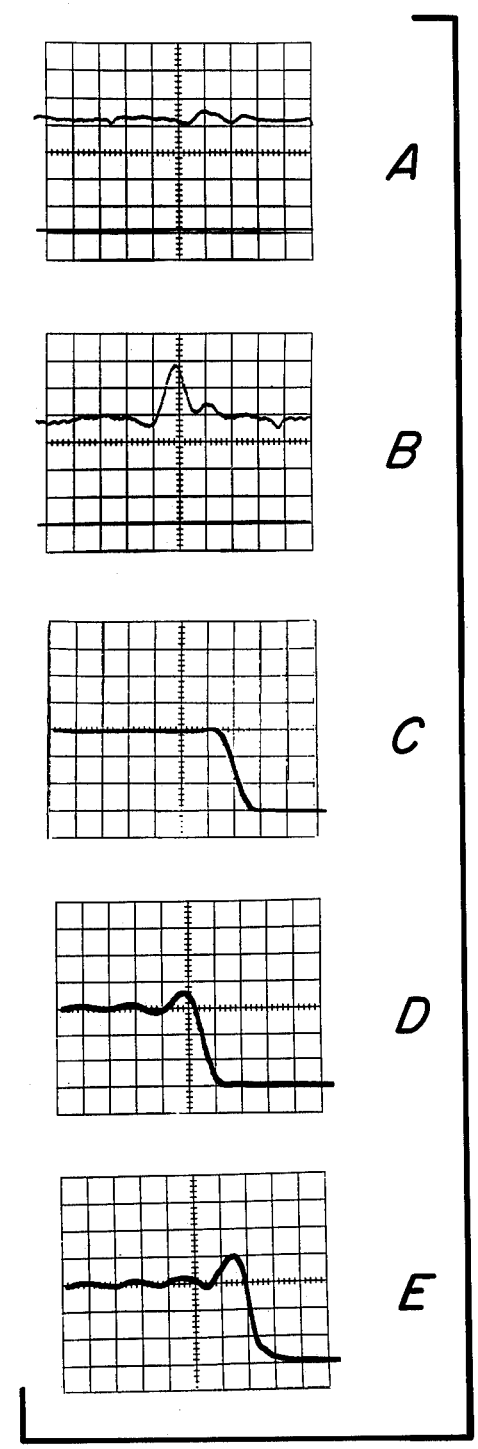
FIGS. 3A-3E are pictorial representations of scanning traces obtained by scanning a phase image according to the imaging system.

Of course, any of the optical processing techniques described above with respect to the transmissive mode system of FIG. 1 are applicable to the reflective mode system of FIG. 3.

Although the scanning system has been described with respect to various preferred embodiments thereof, it is not intended to be limited thereto, but rather those skilled in the art will recognize that variations and modifications may be made therein which are within the spirit of the invention and the scope of the appended claims.

What is claimed is:

1. A method of scanning an image comprising
   (a) providing an image;
   (b) providing a first lens means on axis with the image and one focal length thereof away from said image;
   (c) providing a single deflector means on axis with said first lens means and said image, also one focal length away from said first lens means but on the opposite side thereof from said image;
   (d) directing a beam of collimated light onto said deflector means, wherein as the deflector means controls the scan path the focused beam illuminates the image;
   (e) optically processing said image during the scanning step; and
   (f) collecting the information-modulated light from the scanning step with a readout lens means which focuses the information-modulated light onto an optoelectronic detector located in a plane one focal length away from said readout lens and developing a video signal therefrom, wherein said first lens means and said readout lens means can be the same element.

2. The scanning method as defined in claim 1 wherein said image comprises a phase modulated image.

3. The scanning method as defined in claim 1 wherein said image comprises a photographic transparency.

4. The scanning method as defined in claim 1 and further including
   electronically processing said video signal.

5. The scanning method as defined in claim 1 wherein said deflector means comprises an oscillating mirror adapted to oscillate in horizontal and vertical directions with respect to said image.

6. A method of scanning an image comprising
   (a) providing an image;
   (b) providing a first lens means on axis with the image and one focal length thereof away from said image;
   (c) providing a deflector means on axis with said first lens means and said image, also one focal length away from said first lens means but on the opposite side thereof from said image;
   (d) directing a beam of collimated light onto said deflector means, wherein as the deflector means controls the scan path the focused beam illuminates the image;
   (e) optically processing said image with collimated light by shaping the complex amplitude distribution thereof during the scanning step; and
   (f) collecting the information-modulated light from the scanning step with a readout lens means which focuses the information-modulated light onto an optoelectronic detector located in a plane one focal length away from said readout lens and developing a video signal therefrom, wherein said first lens means and said readout lens means can be the same element.

7. The scanning method as defined in claim 6 wherein shaping the complex amplitude distribution of said collimated light is controlled by the generation of the beam prior to deflection.

8. The scanning method as defined in claim 6 wherein said deflector means comprises an oscillating mirror and wherein the complex amplitude light reflectance of said mirror is shaped in a desired manner.

9. A method of scanning a light transmitting image comprising:
   (a) providing a light transmitting image;
   (b) providing a first lens means on axis with and one focal length away from said image;
   (c) providing a second lens means on the opposite side of said image from said first lens means, said second lens means being on axis and one focal length away from said image;
   (d) providing a deflector means on axis with said first lens means and said image, one focal length away from said first lens means and on the opposite side thereof from said image;
   (e) directing a beam of collimated light onto said deflector means, wherein as the deflector means controls the scan path the focused beam illuminates the image;
   (f) collecting the information-modulated light from the scanning step with said second lens means which focuses the information-modulated light onto an optoelectronic detector located in a plane one focal length away from said second lens means and developing a video signal therefrom.

10. The scanning method as defined in claim 9 and further including
    electronically processing said video signal.

11. The scanning method as defined in claim 9 wherein said image is a photographic transparency.

12. The scanning method as defined in claim 9 and further including
    optically processing said image during the scanning step.

13. The scanning method as defined in claim 12 and further including
    electronically processing said video signal.

14. The scanning method as defined in claim 12 wherein said optical processing step includes using the collimated light as an image processing means by shaping the complex amplitude distribution of said collimated light.

15. The scanning method as defined in claim 14 wherein shaping the complex amplitude distribution of said collimated light is controlled by the generation of the beam prior to deflection.

16. The scanning method as defined in claim 14 wherein said deflector means comprises an oscillating mirror and wherein the complex light amplitude reflectance of said mirror is shaped in a desired manner.

17. The scanning method as defined in claim 9 wherein said deflector means comprises an oscillating mirror adapted to oscillate in horizontal and vertical directions with respect to said image.

* * * * *